United States Patent [19]

Miller

[11] Patent Number: 5,297,231
[45] Date of Patent: Mar. 22, 1994

[54] DIGITAL SIGNAL PROCESSOR INTERFACE FOR COMPUTER SYSTEM

[75] Inventor: David A. Miller, Houston, Tex.
[73] Assignee: Compaq Computer Corporation, Houston, Tex.
[21] Appl. No.: 860,909
[22] Filed: Mar. 31, 1992
[51] Int. Cl.$^5$ .................................................. G10L 3/00
[52] U.S. Cl. .......................................... 395/2.1; 395/2
[58] Field of Search .......................... 395/2, 275, 2.1; 381/29-35; 379/67

[56] References Cited

U.S. PATENT DOCUMENTS

| | | | |
|---|---|---|---|
| 4,631,746 | 12/1986 | Bergeron | 381/35 |
| 4,870,685 | 9/1989 | Kadokama et al. | 381/31 |
| 4,885,763 | 12/1985 | O'Brien | 379/67 |

Primary Examiner—David D. Knepper
Attorney, Agent, or Firm—Konneker, Bush & Hitt

[57] ABSTRACT

Method and apparatus for interfacing audio equipment and a computer system. Compressed parallel digital audio data originating on a system bus associated with the computer system is transmitted to a first data interface where the compressed parallel digital audio data is converted into compressed serial digital audio data. The compressed serial digital audio data is then transmitted to a second data interface associated with a digital signal processor. The second data interface routes the compressed serial digital audio data from the first data interface to the digital signal processor where the data is expanded and then returned to the second data interface. The second data interface then routes the processed serial digital audio data to a digital-to-analog converter where the processed serial digital audio data is converted to analog audio data and transmitted to the audio equipment for output. Analog audio data produced by the audio equipment is transmitted to a analog-to-digital converter for conversion into serial digital data. The analog-to-digital converter then transmits the serial digital audio data to the second data interface which routes the data to the digital signal processor. The digital signal processor compresses the serial digital audio data and returns the data to the second data interface. The second data interface then routes the compressed serial digital audio data to the first data interface where the data is converted into compressed parallel digital audio data and transmitted to the computer system bus.

18 Claims, 3 Drawing Sheets

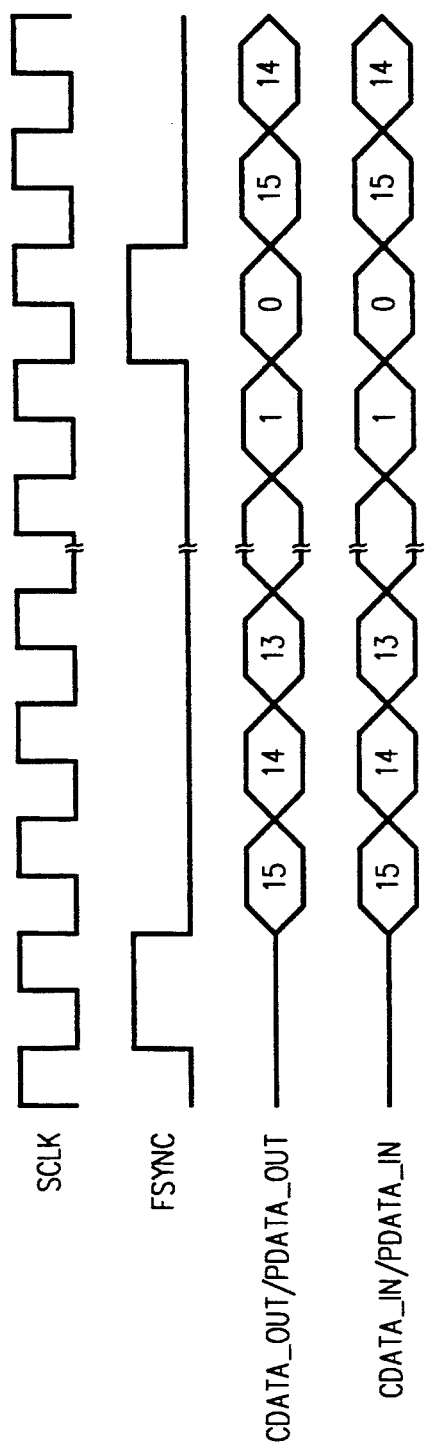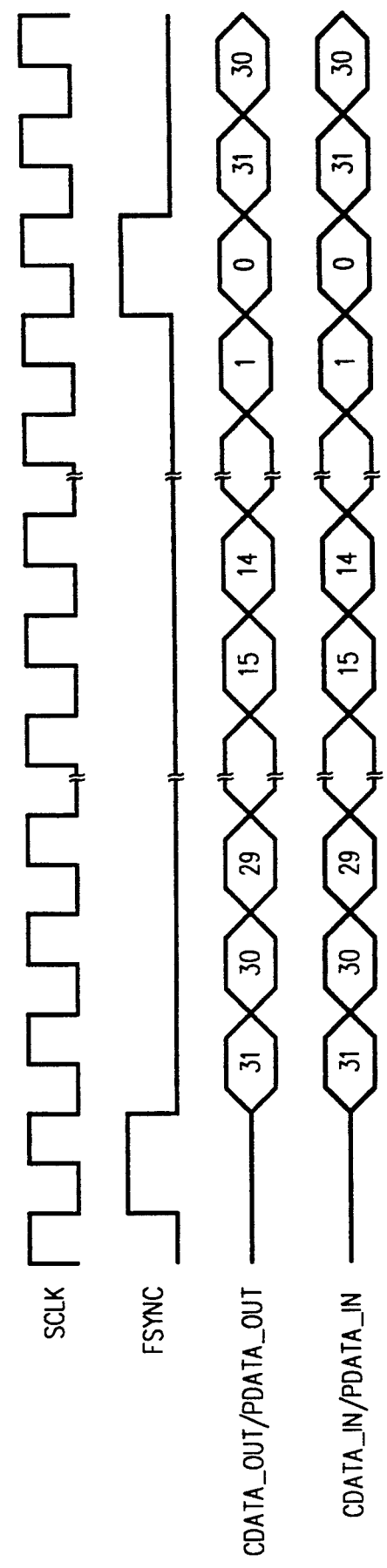

DIGITAL SIGNAL PROCESSOR INTERFACE FOR COMPUTER SYSTEM

BACKGROUND OF THE INVENTION

1. Field of the Invention

The invention relates to computer systems having audio equipment associated therewith and, more particularly, to an audio coder/decoder having a digital signal processor interface.

2. Description of Related Art

In the past, interfaces between a computer system and audio equipment associated therewith were not configured to provide signal processing capability. For example, a typical prior art interface between a computer system and audio equipment may be seen by reference to FIG. 1. Here, an audio coder/decoder 10 which includes a data memory access (or "DMA") interface 12, a digital-to-analog (or "D/A") converter 14 and an analog-to-digital (or "A/D") converter 16 provides the interface between an industry standard architecture (or "ISA") bus 18 of a computer system (not shown) and audio equipment which includes a speaker 20 and an analog input 22, for example, a microphone.

Digital audio signals which, for example, may be propagated by a memory subsystem (not shown) associated with the computer system onto the ISA bus 18, are transmitted from the ISA bus 18 to the DMA interface 12 via an audio data bus 24, most commonly a parallel bus for simultaneously transferring multiple data bits. Digital data input the DMA interface is converted from parallel to serial by a parallel to serial converter (not shown) and transferred to the D/A converter 14. There, the digital serial data is converted into analog and then transmitted to the speaker 20 for audio transmission. Analog audio signal are transmitted by the microphone or other analog input 22 to the A/D converter 16. Here, the analog audio signals are converted into serial digital audio data and transmitted to the DMA interface 12. The DMA interface 12 converts the serial digital audio data into parallel data and transmits the parallel digital audio data to the ISA bus 18 via the data bus 24.

Interfaces between a computer system and associated audio equipment such as the interface illustrated in FIG. 1 are not configured to process the data being output to or input from the audio equipment For example, various data compression techniques have been utilized to compress information encoded in the form of digital data to an abbreviated or shorthand form so that the number of data bits which must be utilized in order to store the encoded information in memory or transmit the encoded information to a selected destination is reduced Typically, a data compression algorithm involves identifying redundant or unnecessary information and substituting an abbreviation or shorthand symbol for that information and the use of such data compression algorithms to reduce the number of bits required to store or transmit data are common.

In order to provide signal processing capability for input and/or output audio signals for an audio interface such as that illustrated in FIG. 1, a digital signal processor would be connected directly to the ISA bus 18. Digital audio signals being transmitted to the DMA interface 12 would first be routed by the ISA bus 18 to the DSP for processing and then returned to the ISA bus 18 for routing to its final destination. As such a configuration would add two bus exchanges for every data transfers to the DMA interface 12, traffic on the ISA bus 18 would increase dramatically. Furthermore, the additional glue logic required in order to permit the DSP to interface with the ISA bus 18 would increase the cost of such a computer system.

SUMMARY OF THE INVENTION

In one embodiment, the present invention is an apparatus for interfacing audio equipment and a computer system which includes a first interfacing means for exchanging digital audio data with a system bus of the computer system, a second interfacing means for exchanging digital audio data with the first interfacing means, a digital signal processor associated with the second interfacing means and converter means. Digital audio data transmitted to the second interfacing means by the first interfacing means is routed to the digital signal processor for processing. The processed digital audio data is then returned to the second interfacing means where it is routed to the conversion means to be converted into analog audio data and output to the audio equipment. Analog audio signals transmitted to the conversion means by the analog equipment are converted into serial digital audio data and transmitted to the second interfacing means which routes the serial digital audio data to the digital signal processor for processing and return. The second interfacing means routes the processed digital audio data originating at the conversion means is transmitted to the first interfacing means for transmission to the system bus.

In another embodiment, the present invention is of an apparatus for interfacing audio equipment and a computer system which includes a first data interface connected to a system bus of the computer system, a second data interface connected to the first data interface, a digital signal processor connected to the second data interface and a digital-to-analog converter connected to the second data interface and the audio equipment The first data interface receives parallel digital audio data from the computer system bus and converts the parallel digital audio data into serial digital audio data. The serial digital audio data is transmitted to the second interface which routes the serial digital audio data to a digital signal processor which processes the serial digital audio data received from the first data interface and returns the processed data to the second data interface. The second data interface transmits the processed serial digital data to the digital-to-analog converter which converts the processed serial digital audio data received from the second data interface into analog audio data. The analog audio data produced thereby is then transmitted to the audio output equipment. In one aspect of this embodiment of the invention, the apparatus further includes an analog-to-digital converter connected to audio input equipment and the second data interface. Analog audio data transmitted to the analog-to-digital converter by the audio input equipment is converted into serial digital data and transmitted to the second data interface. The second data interface route the serial digital audio data received from the analog-to-digital converter to the digital signal processor for processing and return. The second data interface then routes the processed serial digital audio data originating at the analog-to-digital converter to the first data interface where it is converted into processed parallel digital audio data and transmitted to the system bus.

In yet another embodiment, the present invention is a method for playback transmission of a compressed parallel digital audio data signal stored within a computer system. The compressed parallel digital audio data signal is propagated to an audio interface unit associated with a system bus of the computer system, a digital signal processor and audio output equipment. The audio interface unit then converts the compressed parallel digital audio data signal into a compressed serial digital audio data signal and transmits the compressed serial digital audio data signal to the digital signal processor. The digital signal processor expands the compressed serial digital audio data signal and transmits the expanded serial digital audio data signal to the audio interface unit. The expanded serial digital audio data signal is then converted into an analog audio signal and transmitted to the audio output equipment.

In still yet another embodiment, the present invention is a method for capturing a detected analog audio signal for transmission to a computer system. The detected analog audio signal is transmitted to an audio interface unit associated with a system bus of the computer system and a digital signal processor. The audio interface unit converts the analog audio signal into a serial digital audio signal and transmits the serial digital audio signal to a digital signal processor. The serial digital audio signal is compressed and returned to the audio interface unit. The compressed serial digital audio signal is then converted into a compressed parallel digital audio signal and transmitted to the computer system bus.

BRIEF DESCRIPTION OF THE DRAWING

The invention will be more clearly understood and its numerous objects, features and advantages will become more clearly understood by those skilled in the art by reference to the accompanying drawing, in which:

FIG. 4a is a timing diagram for a 16 bit transfer between the DSP interface and the digital signal processor of FIG. 3; and FIG. 4b is a timing diagram for a 32 bit transfer between the DSP interface and the digital signal processor of FIG. 3.

DETAILED DESCRIPTION OF A PREFERRED EMBODIMENT

Figure 1:
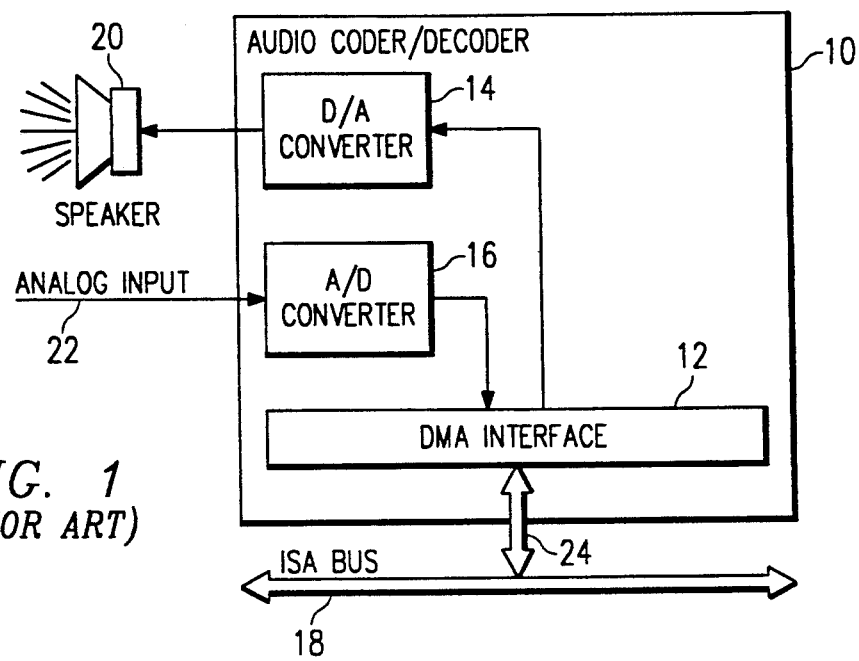
FIG. 1 is a block diagram of a prior art interface between an ISA bus and audio equipment.
Figure 2:
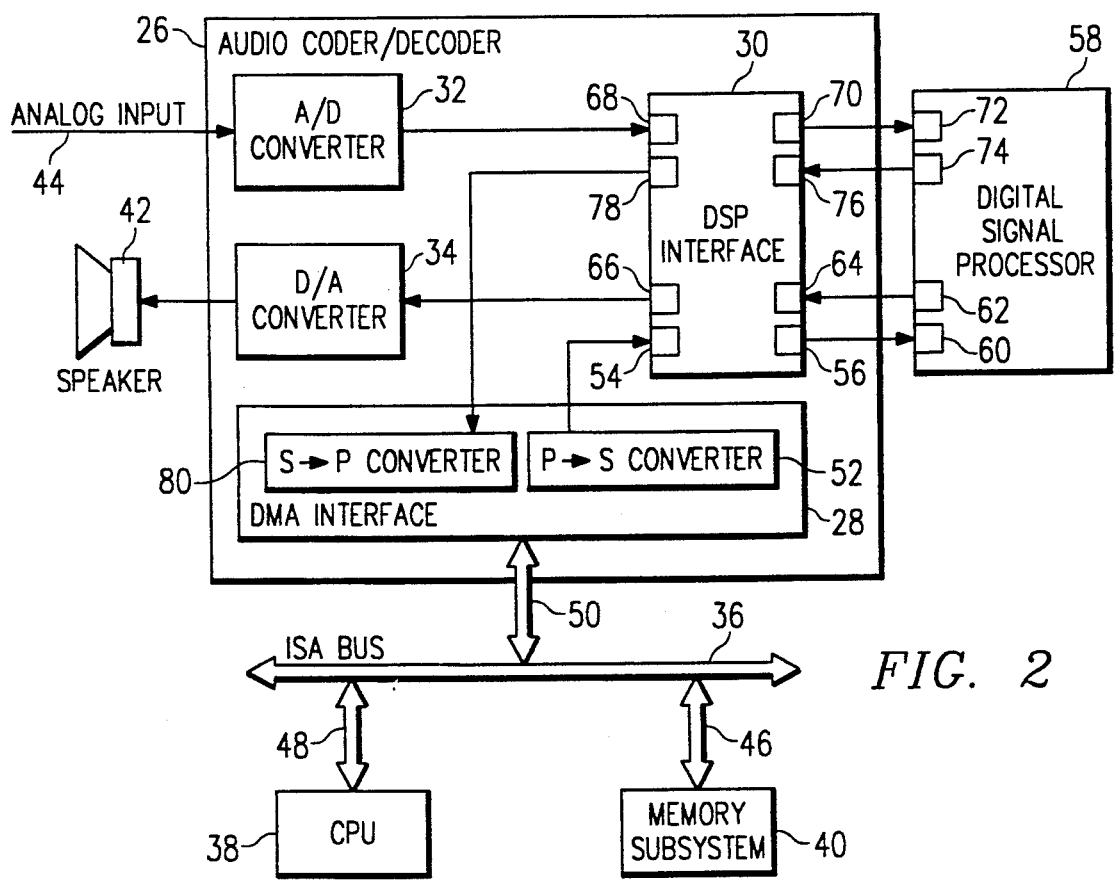
FIG. 2 is a block diagram of an integrated audio coder/decoder unit which provides an interface between a computer system, a digital signal processor and audio equipment.

Referring now to FIG. 2, an integrated audio coder/decoder (or "CODEC") unit for interfacing a computer system with audio equipment associated therewith and which routes the audio signals through a digital signal processor (or "DSP") for processing and constructed in accordance with the teachings of the present invention shall now be described in greater detail. In FIG. 2, an integrated audio CODEC 26 provides an interface for a two-way exchange of audio signals between an ISA bus 36 of a computer system which includes a central processing unit (or "CPU") and a memory subsystem 40 and audio equipment which includes a speaker 42 and an analog input 44. More specifically, the audio CODEC 26, which includes a DMA interface 28, a DSP interface 30, an A/D converter 32 and a D/A converter 34, is configured to permit two types of audio signal transfer operations: audio playback transfer operations whereby digital audio signals resident on the ISA bus 36 are transferred to the analog audio output, here, the speaker 42, and audio capture transfer operations whereby analog audio signals originating at the analog input 44 are transferred to the digital ISA bus 36.

In an audio playback transfer operation, digital audio signals are transmitted from an originating location to the ISA bus 36. For example, digital audio signals may be transferred to the ISA bus 36 from the memory subsystem 40 via a memory interface 46 during a memory read operation in which the CPU 38 will issue instructions to the ISA bus 36 via a bus 48 which initiates a READ cycle from the memory subsystem 40. Once transferred to the ISA bus 36, the digital audio signals are directed to the DMA interface 28 via an audio data bus 50, a parallel bus which simultaneously transfers multiple digital audio data bits, for example, 8 data bits, to the DMA interface. The parallel digital audio data transferred to the DMA interface 28 is then converted from a parallel format to a serial format by a parallel to serial (or "PS") converter 52. The serial digital audio data produced thereby is then transferred, in serial, to a first serial-in port 54 of the DSP interface 30.

As previously discussed, it is often desired to process digital audio data before transferring such data to audio equipment, one such reason being the aforementioned need to decompress (or "expand") digital audio data which is typically compressed by a computer system in order to minimize storage requirements and maximize the speed at which data transfers can occur over the system bus. The DSP interface 30 provides, therefore, an interface with a digital signal processor 58 (hereafter referred to as "DSP 58") to process the digital audio data before transfer to audio equipment Specifically, the digital audio data transferred to the first serial-in port 54 is routed via a first internal serial-out port 56 to a first serial-in port 60 of the DSP 58. There, the DSP 58 processes the digital audio data, in the present example, by expanding the compressed digital audio data into the actual digital audio data, and transfers the processed digital audio data via a first serial-out port 62 to a second serial-in port 64 of the DSP interface 30. The DSP interface 30 then routes the processed digital audio data via a second internal serial-out port 66 to the D/A converter 34. The D/A converter 34 converts the processed serial digital audio data into analog form and transmits the analog audio data produced thereby to the speaker 42, or other analog audio output equipment, for the audible transmission thereof.

One particularly unique advantage of the audio CODEC 26 for interfacing a computer system and audio equipment described herein is the flexibility in selectively providing an interface to the DSP 58 for audio data being routed through the audio CODEC 26. Specifically, in the event that the processing capabilities of the DSP are not needed, the first internal serial-out port 56 and the second serial-in port 64 may be jumpered together. Of course, it should be understood that when the first internal serial-out port 56 and the second serial-in port 64 are jumpered together, the digital audio data is transmitted to the D/A converter in the same manner as described above for the DSP 58 with the exception that the signal never enters the DSP 58. In other words, the digital audio data is received from PS converter 52 by the first serial-in port 54 and is routed to the first internal serial-out port 56 and then directly via the jumper cable, not shown, to the second serial-in port this 64. What is meant by the term "internal serial-out port" of the DSP interface 30 is that the port so designated functions as an out port to the extent that it "out ports" or routes the data either directly to an in port component of the DSP interface 30 when directly connected to it or indirectly when it is connected to an in port through DSP 58. The audio digital data is then routed from the second serial-in port 64 to a second internal serial-out port 66 to the D/A converter 34. In this manner, the audio CODEC 26 may be installed without an associated DSP 58 and, as demands on the system change, the DSP 58 may be installed at a later date without requiring significant modification to the system.

In an audio capture transfer operation, input analog audio signals are generated by audio equipment and transmitted to the audio input 44. For example, the analog audio signal generating equipment may be a microphone which converts detected sounds into an analog audio signal. Analog audio signals provided to the audio input 22 are transmitted to the A/D converter 32 for conversion into serial digital data. The serial digital audio data produced by the A/D converter 32 is then transmitted to a third serial-in port 68 of the DSP interface 30. The DSP interface 30 routes, via a third internal serial-out port 70, the serial digital audio data received from the A/D converter 32 to a second serial-in port 72 of the DSP 58. The DSP 58 processes the serial digital audio data, for example, by compressing the received serial digital audio data in accordance with a preselected compression algorithm, and routes the processed serial digital audio data, via a second serial-out port 74 to a fourth serial-in port 76 of the DSP interface 30. As was the case with the first internal serial-out port 56 and the second serial-in port 64, the third internal serial-out port 70 and the fourth serial-in port 76 may be jumpered together to allow the signal to bypass the DSP 58 and go directly from the third internal serial-out port 70 to the fourth serial-in port 76.

The DSP interface then transmits the processed serial digital data, via a fourth serial-out port 78, to a serial to parallel (or "SP") converter 80 provided within the DMA interface 28. The resultant processed parallel digital audio data produced by the SP converter 80 is output by the DMA interface 28 to the ISA bus 36 via the parallel data bus 50. There, the processed parallel digital audio data may be transferred to any destination, for example, the memory subsystem 40, for storage or other operations.

Figure 3:
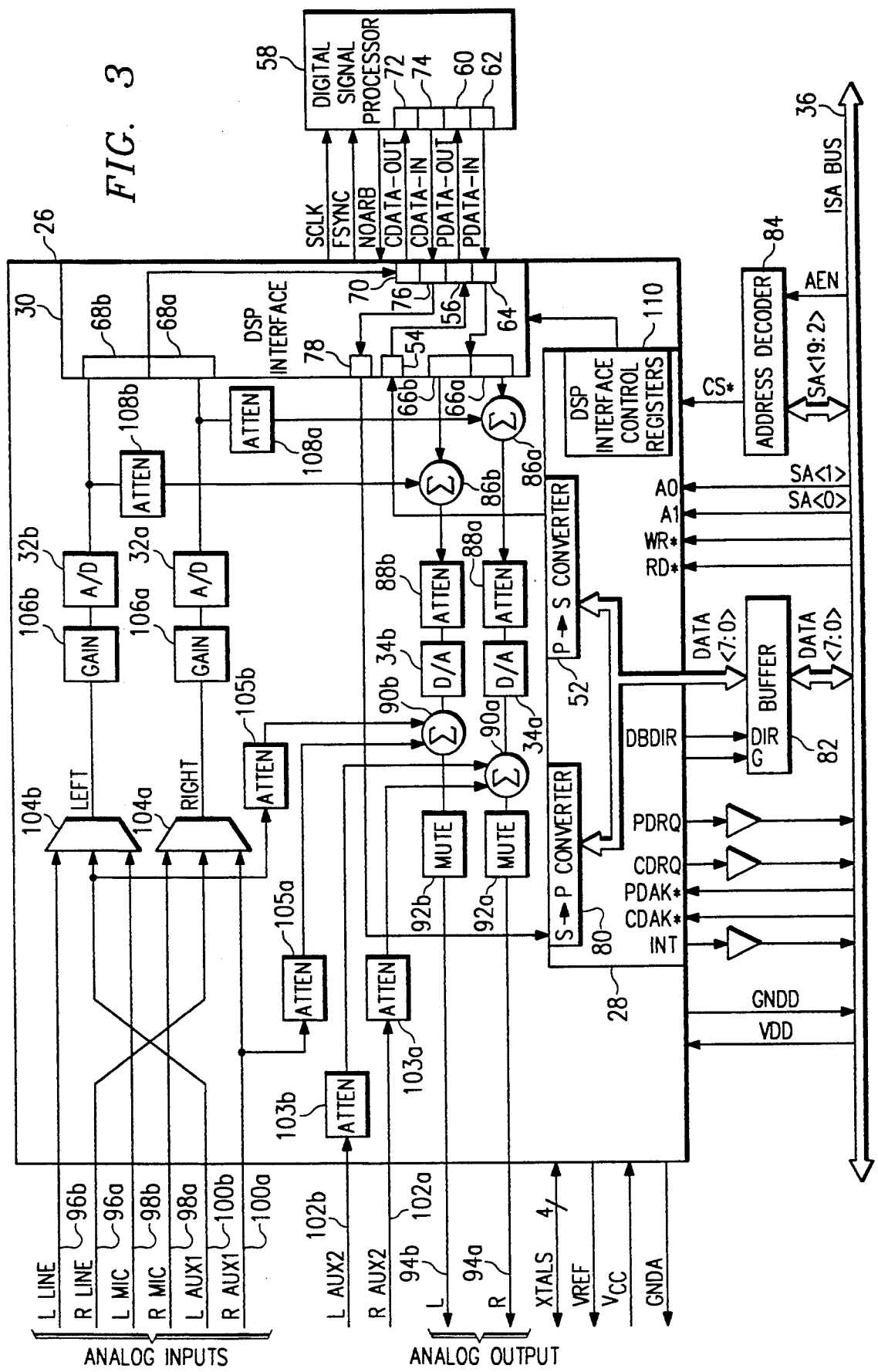
FIG. 3 is an expanded block diagram of the integrated audio code/decoder unit of FIG. 2.

Referring next to FIG. 3, the operation of the audio CODEC 26 shall now be described in greater detail. While the majority of data, address and control signals to be exchanged between the ISA bus 36 and the audio CODEC 26 are transmitted via the DMA interface 28, certain power and control signals are input directly to the audio CODEC 26. More specifically, the ISA bus 36 provides a digital supply voltage which powers the audio CODEC 26 via a digital power line VDD. The ISA bus also provides a digital path to ground GNDD for the audio CODEC 26.

In addition to power and ground lines, the audio CODEC 26 is connected directly with the ISA bus 36 for the exchange of certain control signals. Specifically, the audio CODEC 26 will issue an interrupt signal INT when the audio CODEC 26 or a component thereof requires servicing. In the event of the failure of the audio CODEC 26 or a component thereof, or if the ISA bus 36 is informed of a critical failure or other alert condition occurring elsewhere within the computer system, the CODEC 26 will switch into a powerdown mode where the DMA interface 28 and the DSP interface 30 are shut down.

Certain power and control signals directly connected to the audio CODEC 26 are also connected to an external location. Power signals directly connected to the audio CODEC 26 include an analog power line VCC for providing the audio CODEC 26 with analog power and an analog path to ground GNDA. Similarly, an audio reference level for both input and output audio signals is provided by 2.25 volt reference line VREF. Finally, a four line XTAL bus connecting the ISA bus 36 and the audio CODEC 26 provides an input and output line for first and second clock circuits.

The DMA interface 28 utilizes a request/grant protocol in order to transfer parallel digital audio data to and/or from the ISA bus 36 in which the assertion of respective playback or capture data request pins PDRQ, CDRQ, respectively, actuates the transfer of parallel digital audio data between the audio CODEC 26 and the ISA bus 36. During an audio playback transfer operation in which parallel digital audio data is to be transferred from the ISA bus 36 to the audio equipment via the audio CODEC 26, the DMA interface 28 asserts playback data request pin PDRQ when the audio CODEC 26 is ready for playback data. PRDQ remains asserted until all of the bytes needed for a playback sample have been transferred. The ISA bus 36 responds with an acknowledgement signal and begin strobing data to the DMA interface 28 8 bits at time. More specifically, the ISA bus 36 will assert the write command strobe WR. to indicate that a write, of either data or control signals, to the audio CODEC 26 is taking place. The ISA bus 36 will also assert playback DMA acknowledge signal PDAK low, to indicate that the WR* cycle is a DMA write to buffer 82. The DMA interface 28 will continue to assert PDRQ until the appropriate number of 8 bit cycles required to transfer one audio sample have occurred Under the control of the aforementioned timing signals, a parallel transfer of 8 bits of data from the ISA bus 36 to the buffer 82 occurs over data lines DATA<7:0>. Data bus direction pin DBDIR and data bus enable pin DBEN* are used to control the buffering of data between the DMA interface 28 and the ISA bus 36. Specifically, the DBDIR pin instructs the buffer 82 as to which direction DATA<7:0> should be directed by going high for a write to the DMA interface 28 and going low for a read from the DMA interface 28. The DBEN pin then enables the bus drivers to transmit DATA <7:0> to the DMA interface 28 by going active while the PDAK. signal is active for the DMA cycle.

Within the DMA interface 28, bytes of parallel digital audio data DATA<7:0> is propagated to the PS converter 52 for conversion from parallel to serial and, depending on the size of the audio sample, the resultant 8, 16, or 32 bits of serial data transmitted to the first serial-in port 54 of DSP interface 30. The DSP interface routes the received serial audio digital data out the first internal serial-out port 56 and on to the DSP 58 via the PDATA-IN line. As to be more fully described with respect to FIGS. 4a-b, below, a frame synchronizing signal FSYNC and a serial clock signal SCLK are used to clock the serial audio digital data into and out of the DSP 58.

The DSP 58 receives serial audio digital data via the PDATA-OUT line at first serial-in port 62. The DSP then processes the received playback data and outputs the processed serial audio digital data from the first serial-out port 62. For example, if the serial audio digital data has previously been compressed at a 4:1 ratio, the DSP 58 will expand the compressed serial audio digital data to the actual serial audio digital data utilizing a 1:4 expansion. The DSP 58 will then route the expanded serial audio digital data, via the first serial-out port 62, along the PDATA-IN line to the second serial-in port 64.

As is common in the art, audio digital data is typically comprises of two components. For this reason, the audio CODEC 26 has been configured to provide for the selective transmission of audio digital channel along a first (or "right") channel or along a second (or "left") channel. Accordingly, the second internal serial-out port 66 of the DSP interface 30 has been configured to have two sections, one connected to the left channel and the other connected to the right channel. Thus, the expanded serial digital audio data will be routed to either the first section 66a or the second section 66b of the second internal serial-out port 66. The expanded serial audio digital data will then be transmitted from either the first or second section 66a, 66b of the second internal serial-out port 66 to a digital audio summing circuit 86a, 86b where the expanded serial digital audio data may be selectively combined with serial digital audio data signal originating from analog inputs 96a, 98a, 100a, 96b, 98b, 100b, all of which are to be more fully described below.

The resultant summed serial digital audio data is then transmitted to a digital attenuating circuit 88a, 88b where the gain for the summed serial digital audio data is reduced. The gain reduced serial audio digital data is then transmitted to the D/A converter 34 which, in the embodiment illustrated herein, consists of first and second D/A converters 34a, 34b for converting respective components of the gain reduced summed serial digital audio data into analog form. The analog audio data produced thereby is then transmitted to an analog audio summing circuit 90a, 90b where the analog audio data produced by the D/A converters 34a, 34b may be combined with analog audio data originating from the analog inputs 96a, 98a, 100a, 96b, 98b, 100b. The resultant summed analog audio data is then transmitted to a analog mute circuit 92a, 92b to reduce the audio level for the summed analog audio data or, if an internal control bit is set, fully attenuate the data. The reduced summed analog audio data is then transmitted to analog outputs 94a, 94b, which, for example, may be respective right and left channel speakers of a speaker system, where an audible transmission of the analog audio data as sound occurs.

As previously discussed, in an audio capture transfer operation, analog audio data is generated by audio equipment and transmitted to the ISA bus 36. It should be noted, however, that the audio equipment described and illustrated herein is configured to perform audio capture transfer operations on audio data originating from multiple sources as well as perform mixing and other audio processing. More specifically, two channel analog audio data may originate from a first source, for example, a turntable, as a line level input signal along analog audio input lines 96a, 96b or from a second source, for example, a microphone, as either a line level input signal or as a $-20$ dB from line level input signal along analog audio input lines 98a, 98b. A set of auxiliary analog audio input lines 100a, 100b are provided so that analog audio data may originate from a third source, for example, a tape player and second auxiliary analog audio input lines 102a, 102b are provided so that analog audio data may originate from a fourth source, although the second auxiliary analog audio input line 102a, 102b are fed through an analog attenuating circuit 103a, 103b for gain reduction and into the analog summing circuit 90a, 90b for mixing with analog audio data produced by the D/A converters 34a, 34b. Similarly, the first auxiliary input line 100a, 100b are fed through an analog attenuating circuit 105a, 105b for gain reduction and into the analog summing circuit 90a, 90b for mixing with analog audio data produced by the D/A converters 34a, 34b.

Analog audio input lines 96a, 98a and 100a are connected to first, second and third inputs of multiplexer 104a and analog input lines 96b, 98b and 100b are connected to first, second and third inputs of multiplexer 104b. The multiplexers 104a, 104b select which of the first, second or third analog audio signals are to be processed by the audio CODEC 26 and the components of the selected analog audio signal are then output the multiplexers 104a, 104b and transmitted to a gain circuit 106a, 106b. The gained analog audio signal is then transmitted to the A/D converter 32a, 32b for conversion into serial digital audio data. The A/D converter 32a, 32b then transmits the serial digital audio data produced thereby to the first and second sections 68a, 68b, respectively, of the third serial-in port 68 of the DSP interface 30. The output of the A/D converters 32a, 32b is also connected to the digital summing circuits 86a, 86b for selectively combining the serial digital audio data produced thereby with the serial digital audio data output the first and second sections 66a, 66b of the second serial-out port 66 of the DSP interface 30.

The DSP interface 30 continues the audio capture transfer operation by routing the serial digital audio data received at the third serial-in port 68 through the third serial-out port 60 and along the CDATA-OUT line to the second serial-in port 72 of the DSP 58. The DSP 58 processes the serial digital audio data input thereto during the audio capture transfer operation by compressing the received serial digital audio data and routing the compressed serial digital audio data produced thereby out the second serial-out port 74 and along the CDATA-IN line to the fourth serial-in port 76 of the DSP interface 30. The DSP interface 30 routes the compressed serial digital audio data input the fourth serial-in port 76 to the SP converter 80 via the fourth serial-out port 78. The SP converter 80 converts the compressed serial digital audio data to parallel and transmits bytes of the compressed parallel digital audio data to the data buffer 82.

More specifically, when the DMA interface 28 has a captured audio sample ready for transfer to the ISA bus 36, the DMA interface 28 asserts capture data request pin CDRQ to actuate the transfer of parallel digital audio data from the DMA interface 28 to the ISA bus 36. The ISA bus 36 responds with an acknowledgment signal and begins strobing bytes of data to the ISA bus 36. More specifically, the ISA bus 36 will assert the read command strobe RD. to indicate that a read, of either data or control signals, from the DMA interface is taking place. The ISA bus 36 will also assert capture data acknowledgment signal CDAK low, to indicate that the RD* cycle occurring is a DMA read from the buffer 82

The DMA interface 28 will continue to assert CRDQ until all data bytes from the buffer 82 needed for a capture sample have been transferred to the ISA bus 36.

Under the control of the aforementioned timing signals, a parallel transfer of 8 bits of data from the ISA bus 36 to the buffer 82 occurs over data lines DATA<7:0>. Again, DBDIR and DBEN* control the buffering of data between the DMA interface 28 and the ISA bus 36. Here, the DBDIR goes low to indicate that the data transfer is a read from the DMA interface 28 and DBEN. goes active to enable the bus drivers to transmit DATA <7:0> to the ISA bus 36. Once on the ISA bus 36, the captured parallel compressed digital audio data may be routed to its final destination, for example, a memory subsystem associated with the ISA bus 36 using a conventional write operation.

Referring next to FIGS. 3 and 4a–b, the transfer of data between the DSP interface 30 and the DSP 58 and the protocol by which such transfers occur shall now be described in greater detail. The DSP interface 30 is formatted in an I²S serial bus protocol format. The transfer of data between the DSP interface 30 and the DSP 58 in the serial bus protocol format is controlled by a DSP interface control register 110 within the DMA interface 28. The DSP interface control register 110 permits the selection of polarity and frame rate of the serial data signals propagated thereby as well as the ability to disable the DSP interface 30. More specifically, the DSP interface control register 110 is an eight bit register configured as illustrated in Table I below:

TABLE I

| D7 | D6 | D5 | D4 | D3 | D2 | D1 | D0 |
|----|----|----|----|----|----|----|-----|
| CI | DI | FI | FS |    |    |    | DEN | where:
- CI (or "clock invert") changes the clock edge used to clock data (CI=0 clocks data on the rising edge and CI=1 clocks data on the falling edge;
- DI (or "data invert") inverts data signals to the DSP interface 30 when enabled (DI=0 does not invert data and DI=1 inverts data);
- FI (or "frame sync invert") inverts the frame sync signal (or "FSYNC") when enabled (FI=0 does not invert FSYNC and FI=1 inverts FSYNC);
- FS (or "frame size") determines the frequency at which the DSP interface 30 generates FSYNC (FSYNC generated every 32 bits when FS=0 and FSYNC generated every 16 bits when FS=1); and
- DEN (or "DSP interface enable") enables the DSP interface 30 to transmit and receive data (DSP interface 30 disabled when DEN=0 and DSP interface enabled when DEN=1).

The contents of the DSP interface control registers is provided by the ISA bus 36 via lines WR*, RD*, and SA<0:1>. During a control register read or write operation, system addresses SA<2:19> and address enable signal AEN are transferred to an address decoder 84. The address decoder 84 decodes SA<2:19> and drives chip select signal CS active, thereby enabling the DSP interface control registers 110 a cycle access, either read or write Access to the control registers during cycle accesses is then controlled by system addresses SA<0> and SA<1> which control address pins A1 and A0, respectively.

The contents of the DSP interface control registers 110 may then be used to control serial digital audio data transfers between the DSP interface 30 and the DSP 58, either at a 16 bit frame rate or at a 32 bit frame rate. In FIG. 4a, the frame rate has been selected to be 16 bits. The DSP interface 30 drives FSYNC high to indicate that the transfer of a frame of data having the selected width is to be commenced The transfer of a frame of data commences on the falling edge of FSYNC. The DSP interface 30 then generates the SCLK signal to clock each data bit of the frame into the DSP 50 (during CDATA-OUT or PDATA-OUT operations) and/or into the DSP interface 30 (during CDATA-IN or PDATA-IN operations) on a falling edge of SCLK In FIG. 4b, the transfer of a 32 bit frame of data is illustrated. Except for the time elapsing the number of data bits clocked in between consecutive FSYNC pulses, the transfer of a 32 bit frame of data is operates the same as a 16 bit transfer It is further contemplated that the transfer of data, either from the ISA bus 36 to the audio equipment during an audio playback transfer operation or from the audio equipment to the ISA bus 36 during an audio capture transfer operation can occur continuously. For example, after the DMA interface 28 has transferred a first frame of data to the DSP interface 30, the DMA interface 28 may then receive a next frame of data from the ISA bus 36. In order to permit the continuous transfer of data during playback and capture transfer operations, an arbitration protocol must be provided, particularly when the DSP 58 compresses or expands the data during processing.

In the example disclosed herein, it is contemplated that the DSP 58 shall perform 1:4 expansion on data received from the ISA bus 36 during a playback transfer operation and 4:1 compression on data received from the audio inputs 96a, 96b, 98a, 98b, 100a, 100b, during a capture transfer operation. As the rates at which data is input and output the DSP interface 30 differ, a NOARB signal is utilized to alter data rates when necessary. When the DSP 58 asserts NOARB, the DMA interface 28 will cease arbitrating once the current arbitration is complete, thereby masking CDRQ and PDRQ. The data sent to the DSP 58 via PDATA-OUT will be the previous value before NOARB was asserted and will be continuously repeated until NOARB is deasserted Data received by the DSP interface 30 via PDATA-IN will continue to be routed to the D/A converters 34a, 34b unaffected by NOARB.

During a capture transfer operation, data sent to the DSP 58 from the A/D converters 32a, 32b will be unaffected by NOARB. However, data routed to the DMA interface 28 by the DSP interface 30 will be ignored by the DMA interface 28 while NOARB is asserted. Upon deassertion of NOARB, normal transfer operations will resume after the following FSYNC.

The foregoing detailed description is to be clearly understood as being given by way of illustration and example only, the spirit and scope of the present invention being limited solely by the appended claims.

What is claimed is:

1. Apparatus for interfacing audio equipment and a computer system, comprising:
    first interfacing means for exchanging digital audio data with a system bus of said computer system;
    second interfacing means for exchanging digital audio data with said first interfacing means; and
    converter means for converting digital audio data received from said second interfacing means into analog format for output to said audio equipment and analog audio data received from said audio equipment into digital format for output to said second interfacing means, said second interfacing means including means including means for routing digital audio data received from said first interfacing means to said converter means and said audio equipment including means for routing analog audio data originating thereat to said converter means; wherein said second interfacing means further comprises:
- a first serial-in port for receiving digital audio data transmitted by said first interfacing means;
- a first internal serial-out port;
- a second serial-in port;
- said first internal serial-out port directly propagating received digital audio data to said second serial-in port when said first internal serial-out port is directly interconnected with said second serial-in port and indirectly propagating received digital audio data to said second serial-in port via said digital signal processor when said first internal serial-out port is indirectly interconnected with said second serial-in port via said digital signal processor, said digital signal processing digital audio data propagated from said first internal serial-out port to said second serial-in port via said digital signal processor; and
- a second internal serial-out port for routing signal audio data received from said second serial-in port to said converter means;
- said second interfacing means routing digital audio signals received from said converter means to said first interfacing means.

2. The apparatus for interfacing audio equipment and a computer system according to claim 1, wherein said second interfacing means further comprises means for adjusting the rate at which digital data is transferred from said first interfacing means to said second interfacing means.

3. The apparatus for interfacing audio equipment and a computer system according to claim 2, wherein said second interfacing means further comprises means for reducing the rate of data transfers from said first interfacing means to said second interfacing means to one fourth the rate of data transfers from said second interfacing means to said conversion means.

4. The apparatus for interfacing audio equipment and a computer system according to claim 3, wherein said first interfacing means further comprises:
- parallel-to-serial converter means for converting parallel digital audio data originating at said computer system to serial digital audio data; and
- serial-to-parallel converter means for converting serial digital audio data produced by said conversion means into parallel digital audio data.

5. The apparatus for interfacing audio equipment and a computer system according to claim 1, wherein said second interfacing means further comprises:
- a third serial-in port for receiving digital audio data transmitted by said converter means;
- a third internal serial-out port;
- a fourth serial-in port;
- said third internal serial-out port directly propagating received digital audio data to said fourth serial-in port when said third internal serial-out port is directly interconnected with said fourth serial-in port and indirectly propagating received digital audio data to said fourth serial-in port via said digital signal processor when said third internal serial-out port is indirectly interconnected with said fourth serial-in port via said digital signal processor, said digital signal processor processing digital audio data propagated from said third internal serial-out port to said fourth serial-in port via said digital signal processor; and
- a fourth internal serial-out port for routing digital audio data received from said third serial-in port to said first interfacing means.

6. The apparatus for interfacing audio equipment and a computer system according to claim 5, wherein said second interfacing means further comprises means for adjusting the rate at which digital audio data is transferred from said first interfacing means and said conversion means, respectively, to said second interfacing means.

7. The apparatus for interfacing audio equipment and a computer system according to claim 6, wherein said second interfacing means further comprises:
- means for reducing the rate of data transfers from said first interfacing means to one fourth the rate of data transfers to said conversion means; and
- means for increasing the rate of data transfers to said first interfacing means to four times the rate of data transfers from said conversion means.

8. The apparatus for interfacing audio equipment and a computer system according to claim 7, wherein said first interfacing means further comprises:
- serial-to-parallel converter means for converting parallel digital audio data originating at said computer system into serial digital audio data; and
- parallel-to-serial converter means for converting serial digital audio data produced by said conversion means into parallel digital audio data.

9. The apparatus for interfacing audio equipment and a computer system according to claim 5 and further comprising first jumper means for directly interconnecting said first serial-out port and said second serial-in port.

10. The apparatus for interfacing audio equipment and a computer system according to claim 9 and further comprising second jumper means for directly interconnecting said third serial-out port and said fourth serial-in port.

11. The apparatus for interfacing audio equipment and a computer system according to claim 1 and further comprising first jumper means for directly interconnecting said first serial-out port and said second serial-in port.

12. Apparatus for interfacing audio equipment and a computer system, comprising:
- a first data interface connected to a system bus of said computer system, said first data interface receiving parallel digital audio data from said computer system bus and converting said parallel digital audio data into serial digital audio data;
- a second data interface connected to said first data interface, said second data interface receiving serial digital audio data from said first data interface, said second data interface including:
  - a first serial-in port for receiving serial digital audio data transmitted by said first data interface;
  - a first internal serial-out port;
  - a second serial-in port;
  - said first internal serial-out port directly propagating received serial digital audio data to said second serial-in port when said first internal serial-out port is directly interconnected with said second serial-in port and indirectly propagating received signal serial digital audio data to said second serial-in port via said digital signal processor when said first internal serial-out port is indirectly interconnected with said second serial-in port via said digital signal processor, said digital signal processor processing serial digital audio data propagated from said first internal serial-out port to said second serial-in port via said digital signal processor; and a second internal serial-out port for routing digital audio data received from said second serial-in port;

a digital-to-analog converter connected to said second internal serial-out port of second data interface and to said audio equipment, said digital-to-analog converter converting serial digital audio data received from said second data interface into analog audio data and transferring said analog audio data produced thereby to audio output equipment.

13. The apparatus for interfacing audio equipment and a computer system according to claim 12 and further comprising first jumper means for directly interconnecting said first serial-out port and said second serial-in port.

14. The apparatus for interfacing audio equipment and a computer system according to claim 13 and further comprising:

an analog-to-digital converter connected between audio input equipment and said second data interface, said analog-to-digital converter converting analog audio data received from said audio input equipment into serial digital audio data and transferring said serial digital audio data produced thereby to said second data interface;

said second data interface further comprising:
a third serial-in port for receiving said serial digital audio data produced by said analog-to-digital converter;
a third internal serial-out port;
a fourth serial-in port;
said third internal serial-out port directly propagating said received serial digital audio data to said fourth serial-in port when said third intrnal serial-out port is directly interconnected with said fourth serial-in port and indirectly propagating said received serial digital audio data to said fourth serial-in port via said digital signal process when said third internal serial-out port is indirectly interconnected with said fourth serial-in port via said digital signal processor, said digital signal processor processing serial digital audio data propagated from said third internal serial-out port to said fourth serial-in port via said digital signal processor; and
a fourth internal serial-out port for routing said serial digital audio data received from said fourth serial-in port to said first interfacing means;
said first data interface converting processed serial digital audio data from said second data interface into parallel digital audio data for transmission to said system bus.

15. The apparatus for interfacing audio equipment and a computer system according to claim 14 and further comprising second jumper means for directly interconnecting said third serial-out port and said fourth serial-in port.

16. Apparatus for interfacing audio equipment and a computer system, comprising:
first interfacing means for exchanging digital audio data with a system bus of said computer system;
second interfacing means for exchanging digital audio data with said first interfacing means; and
converter means for converting digital audio data received from said second interfacing means into analog format for output to said audio equipment and analog audio data received from said audio equipment into digital format for output to said second interfacing means;
said second interfacing means further comprising:
a first serial-in port for receiving digital audio data transmitted by said first interfacing means;
a first internal serial-out port;
a second serial-in port;
said first internal serial-out port directly propagating received digital audio data to said second serial-in port when said first internal serial-out port is directly interconnected with said second serial-in port and indirectly propagating received digital audio data to said second serial-in port via said digital signal processor when said first internal serial-out port is indirectly interconnected with said second serial-in port via said digital signal processor, said digital signal processor processing digital audio data propagated from said first internal serial-out port to said second serial-in port via said digital signal processor;
a second internal serial-out port for routing digital audio data received from said second serial-in port to said converter means;
a third serial-in port for receiving digital audio transmitted by said converter means;
a third internal serial-out port;
a fourth serial-in port;
means for interconnecting said third internal serial-out port directly with said fourth serial-in port or indirectly via said digital signal processor;
said third internal serial-out port directly propagating received digital audio data to said fourth serial-in port when said third internal serial-out port is directly interconnected with said fourth serial-in port and indirectly propagating received digital audio data to said fourth serial-in port via said digital signal processor when said third internal serial-out port is indirectly interconnected with said fourth serial-in port via said digital signal processor, said digital signal processor processing digital audio data propagated from said third internal serial-out port to said fourth serial-in port via said digital signal processor; and
a fourth internal serial-out port for routing digital audio data received from said third serial-in port to said first interfacing means.

17. The apparatus for interfacing audio equipment and a computer system according to claim 16 and further comprising first jumper means for directly interconnecting said first serial-out port and said second serial-in port.

18. The apparatus for interfacing audio equipment and a computer system according to claim 17 and further comprising second jumper means for directly interconnecting said third serial-out port and said fourth serial-in port.

* * * * *